(12) United States Patent
Yoon et al.

(10) Patent No.: US 10,015,739 B2
(45) Date of Patent: Jul. 3, 2018

(54) USER TERMINAL FOR CONTROLLING DISPLAY DEVICE AND CONTROL METHOD THEREOF

(71) Applicant: SAMSUNG ELECTRONICS CO., LTD., Suwon-si (KR)

(72) Inventors: Seung-il Yoon, Yongin-si (KR); Jee-hoon Ka, Suwon-si (KR); Sang-jin Kim, Suwon-si (KR); Dae-hyun Nam, Anyang-si (KR); Kyung-hoon Lee, Seoul (KR); Kyung-hee Jung, Suwon-si (KR); Hyun-kyu Yun, Seoul (KR); Byung-jo Jun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 14/740,479

(22) Filed: Jun. 16, 2015

(65) Prior Publication Data
US 2016/0150472 A1 May 26, 2016

(30) Foreign Application Priority Data

Nov. 21, 2014 (KR) ........................ 10-2014-0163258

(51) Int. Cl.
*H04W 52/02* (2009.01)
*G06F 1/32* (2006.01)
*H04W 88/06* (2009.01)

(52) U.S. Cl.
CPC ...... *H04W 52/0209* (2013.01); *G06F 1/3209* (2013.01); *G06F 1/3293* (2013.01);
(Continued)

(58) Field of Classification Search
CPC . H04W 52/0209; H04W 88/06; G06F 1/3209; G06F 1/3293; Y02B 60/121;
(Continued)

(56) References Cited

U.S. PATENT DOCUMENTS 8,429,435 B1    4/2013  Clayton et al.
9,844,096 B2   12/2017  Son et al.
(Continued)

FOREIGN PATENT DOCUMENTS

CN    102523402 A    6/2012
CN    102779007 A   11/2012
(Continued)

OTHER PUBLICATIONS

Communication dated Mar. 29, 2016, issued by the European Patent Office in counterpart European Patent Application No. 15194704.1.
(Continued)

*Primary Examiner* — Charles Appiah
*Assistant Examiner* — Margaret G Mastrodonato
(74) *Attorney, Agent, or Firm* — Sughrue Mion, PLLC

(57) ABSTRACT

A user terminal for controlling a display device and a control method thereof are provided. The user terminal includes a communicator configured to communicate with the display device, a main controller configured to control the user terminal, and a sub-controller configured to control the user terminal while the user terminal is in a sleep mode, wherein the sub-controller is configured to change a mode of the user terminal from the sleep mode to a standby mode in response to the communicator receiving environmental change detection information or user detection information from the display device while the user terminal is in the sleep mode.

18 Claims, 12 Drawing Sheets

(52) U.S. Cl.
CPC ........... *H04W 88/06* (2013.01); *Y02D 10/122* (2018.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01)

(58) Field of Classification Search
CPC .......... Y02B 60/50; H04N 5/144; H04N 5/63; H04N 21/44218
See application file for complete search history.

(56) References Cited

U.S. PATENT DOCUMENTS

| | | | |
|---|---|---|---|
| 2011/0018817 A1* | 1/2011 | Kryze | G08C 17/02 345/173 |
| 2011/0249836 A1* | 10/2011 | Solum | H04R 25/558 381/314 |
| 2013/0054986 A1 | 2/2013 | Kim et al. | |
| 2013/0084922 A1 | 4/2013 | Liu et al. | |
| 2014/0055251 A1 | 2/2014 | Son et al. | |
| 2014/0104500 A1* | 4/2014 | Wong | G06F 3/011 348/734 |
| 2014/0145860 A1* | 5/2014 | Park | H04Q 9/00 340/870.16 |
| 2014/0181558 A1* | 6/2014 | Taha | G06F 1/3206 713/323 |
| 2014/0195235 A1 | 7/2014 | Cha et al. | |
| 2014/0229184 A1 | 8/2014 | Shires | |
| 2016/0061600 A1* | 3/2016 | Dharawat | G06F 1/3231 702/150 |
| 2016/0183326 A1 | 6/2016 | Son et al. | |

FOREIGN PATENT DOCUMENTS

| | | |
|---|---|---|
| CN | 103294171 A | 9/2013 |
| CN | 103634460 A | 3/2014 |
| EP | 2293147 A2 | 3/2011 |
| KR | 10-2013-0021862 A | 3/2013 |

OTHER PUBLICATIONS

Search Report (PCT/ISA/210) dated Nov. 30, 2015 by the International Searching Authority in International Application No. PCT/KR2015/007621.

Written Opinion (PCT/ISA/237) dated Nov. 30, 2015 by the International Searching Authority in International Application No. PCT/KR2015/007621.

Communication dated Feb. 5, 2018, issued by the State Intellectual Property Office in counterpart Chinese Application No. 201510810376.3.

* cited by examiner

FIG. 8

| User Terminal Mode | User Terminal State | Sensor | Sub controller | RAM | Main controller | Display | wifi | BT BLE |
|---|---|---|---|---|---|---|---|---|
| Normal Mode (800) | User terminal usable state or TV controllable state using user terminal | √ | √ | √ | √ | √ | √ | √ |
| Standby Mode (810) | Display-off according to time lapse | √ | √ | √ | √ |  | √ | √ |
|  | Power-off of WiFi module when predetermined time elapses after display-off | √ | √ | √ | √ |  |  | √ |
| Sleep Mode (820) | Power-off of TV / Power-off of main controller due to non-sensing of user or user operation intention | √ | √ | √ |  |  |  | √ |
| Deep Sleep Mode (825) | Power-off of RAM when predetermined time elapses after change to sleep mode or power-off of TV | √ | √ |  |  |  |  | √ |
| Power-off (830) | Power-off of all configurations except for sub-controller |  | √ |  |  |  |  |  |

USER TERMINAL FOR CONTROLLING DISPLAY DEVICE AND CONTROL METHOD THEREOF

CROSS-REFERENCE TO RELATED APPLICATION

This application claims priority from Korean Patent Application No. 10-2014-0163258, filed on Nov. 21, 2014 in the Korean Intellectual Property Office, the disclosure of which is incorporated herein by reference.

BACKGROUND

1. Field

Apparatuses and methods consistent with exemplary embodiments relate to a user terminal for controlling a display device and a control method thereof, and more particularly to a user terminal for controlling a display device and a control method thereof, which can efficiently manage power of the user terminal.

2. Description of the Related Art

Recently, various user terminals have been used to control a display device, such as a television (TV), in addition to a remote controller. For example, users can use applications for controlling a display device installed on various types of user terminals, such as a smart phone or tablet personal computer (PC), to control the display device, and to interact with the display device.

The user terminal may be separately provided with a display, a speaker, and various kinds of communication modules to facilitate control of the display device, and thus may require a large amount of power consumption. Accordingly, the user terminal must be charged frequently.

On the other hand, the user terminal may be shared by several persons. That is, the user terminal may be shared by a plurality of users who use the display device, and thus unlike a smart phone, a tablet PC, or a notebook computer, which is used by an individual user, the users may not feel the necessity to charge the user terminal.

Accordingly, there is a need for approaches to efficiently manage the power of a user terminal that controls a display device and to immediately react to a user command for controlling the display device.

SUMMARY

One or more exemplary embodiments provide a user terminal for controlling a display device and a control method thereof, which can efficiently manage a power of the user terminal according to surrounding environment and various kinds of information thereof, and can immediately react on a user command.

According to an aspect of an exemplary embodiment, there is provided a user terminal for controlling a display device, the user terminal including a communicator configured to communicate with the display device; a main controller configured to control the user terminal; and a sub-controller configured to control the user terminal while the user terminal is in a sleep mode, wherein the sub-controller is configured to change a mode of the user terminal to a standby mode in response to the communicator receiving environmental change detection information or user detection information from the display device while the user terminal is in the sleep mode.

The main controller may be configured to be in a power-off state while the user terminal is in the sleep mode, and the sub-controller may be configured to change the mode of the user terminal to the standby mode by turning on power to the main controller in response to the communicator receiving the environmental change detection information or the user detection information from the display device while the user terminal is in the sleep mode.

The user terminal may further include a volatile memory, wherein the sleep mode is one of a second sleep mode in which power to the volatile memory is turned on or a first sleep mode in which power to the volatile memory is turned off.

The sub-controller may be configured to change the mode of the user terminal from the first sleep mode to the second sleep mode by turning on the power to the volatile memory in response to the communicator receiving environmental change detection information which indicates detection of a first event from the display device while the user terminal is in the first sleep mode.

The first event may include at least one of a change in illumination outside a threshold range, a change in temperature outside a threshold range, or a sound input that exceeds a threshold level.

The sub-controller may be configured to change the mode of the user terminal to from the second sleep mode to the standby mode by turning on power to the main controller in response to the communicator receiving user detection information which indicates detection of a second event from the display device while the user terminal is in the second sleep mode.

The second event may include at least one of the presence of a user within a predetermined distance, the display device is powered on, and a user voice input.

According to an aspect of another exemplary embodiment, there is provided a user terminal for controlling a display device, the user terminal including a communicator configured to communicate with the display device; a main controller configured to control the user terminal; and a sub-controller configured to control the user terminal while the user terminal is in a sleep mode, wherein the main controller is configured to change a mode of the user terminal from a standby mode to the sleep mode by turning off power to the main controller in response to a predetermined event occurring while the user terminal is in the standby mode.

The predetermined event may include not receiving from the display device for a threshold time at least one of information indicating detection of a presence of a user within a threshold distance, information indicating detection of a user voice input, information indicating a change in illumination outside a threshold range, a temperature change outside a threshold range, and information indicating a sound input exceeding a threshold level.

The user terminal may further include a volatile memory; and a nonvolatile memory, wherein the sub-controller is configured to apply power to the main controller in response to the predetermined event occurring after the power of the main controller is turned off, and the main controller is configured to move information stored in the volatile memory to the nonvolatile memory and to turn off the power of the main controller and the volatile memory.

According to an aspect of another exemplary embodiment, there is provided a control method of a user terminal for controlling a display device, the control method including operating the user terminal in a sleep mode; and changing a mode of the user terminal from the sleep mode to a standby mode in response to receiving environmental change detection information or user detection information from the display device while the user terminal is in the sleep mode.

The user terminal may include a main controller that may be in a power-off state while the user terminal is in the sleep mode, and the changing may include changing the mode of the user terminal to the standby mode by turning on power to the main controller in response to receiving the environmental change detection information or the user detection information from the display device while the user terminal is in the sleep mode.

The sleep mode may be one of a second sleep mode in which power to the volatile memory that is included in the user terminal is turned on and a first sleep mode in which power to the volatile memory is turned off.

The changing may further include changing the mode of the user terminal to the second sleep mode by turning on the power of the volatile memory in response to receiving environmental change detection information which indicates detection of a first event from the display device while the user terminal is in the first sleep mode.

The first event may include at least one of a change in illumination outside a threshold range, a change in temperature outside a threshold range, and a sound input exceeding a threshold level.

The changing the mode of the user terminal may include changing the mode of the user terminal to the standby mode by turning on power to the main controller in response to receiving user detection information which indicates detection of a second event from the display device while the user terminal is in the second sleep mode.

The second event may include at least one of a presence of a user within a predetermined distance, the display device is powered on, and a user voice input.

According to an aspect of another exemplary embodiment, there is provided a control method of a user terminal for controlling a display device, the control method including operating the user terminal in a standby mode; and changing a mode of the user terminal to from the standby mode to a sleep mode by turning off power to a main controller included in the user terminal in response to a predetermined event occurring while the user terminal is in the standby mode.

The predetermined event may include not receiving from the display device for a threshold time at least one of information indicating a presence of a user within a threshold distance, information indicating a user voice input, information indicating a change in illumination outside a threshold range, information indicating a change in temperature outside a threshold range, and information indicating a sound input exceeding a threshold level.

The control method may further include applying power to the main controller in response to the predetermined event occurring after the power of the main controller is turned off, and moving information stored in a volatile memory to a nonvolatile memory and turning off power to the main controller and the volatile memory.

BRIEF DESCRIPTION OF THE DRAWINGS

The above and/or other aspects will be more apparent from the following detailed description of exemplary embodiments with reference to the accompanying drawings, in which:

FIG. 8 is a diagram explaining various modes of a user terminal for controlling a display device according to an exemplary embodiment;

DETAILED DESCRIPTION OF EXEMPLARY EMBODIMENTS

Hereinafter, various exemplary embodiments are described in detail with reference to the accompanying drawings. Further, in the following description, a detailed description of known functions and configurations incorporated herein will be omitted when it may make the subject matter of the exemplary embodiments unclear. Also, the terms used in the specification are to be understood considering functions of the exemplary embodiments, and may be understood differently according to the intention of a user, an operator, or custom. Therefore, the meaning of the terms should be understood based on the entire content of the specification.

Figure 1:
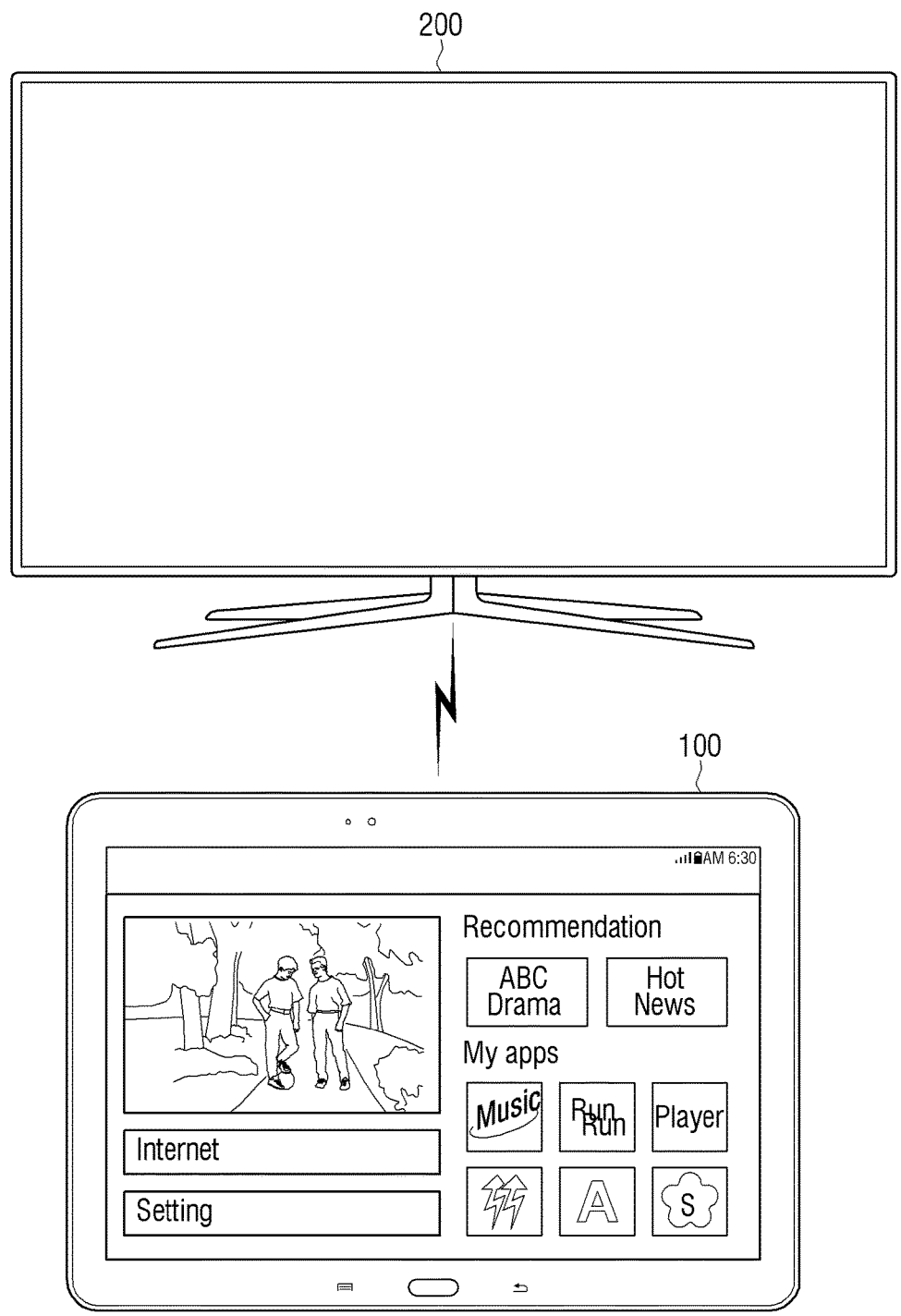
FIG. 1 is a diagram illustrating a display device and a user terminal according to an exemplary embodiment.

FIG. 1 is a diagram illustrating a display device 200 and a user terminal 100 according to an exemplary embodiment. As illustrated in FIG. 1, the display device 200 may be a TV. However, this is merely exemplary, and the display device 200 may be implemented by various electronic devices, such as a cellular phone, a tablet PC, a digital camera, a camcorder, a notebook PC, a desktop PC, a personal digital assistant (PDA), and an MP3 player, which include displays and can be used to interact with the user terminal 100.

The user terminal 100 is an electronic device for controlling the display device 200, such as a remote controller or a cellular phone. That is, the user terminal 100 is an electronic device which is separately provided with a display, various kinds of sensors, and a communicator for performing communication with the display device 200, and receives an input of various kinds of user commands for controlling the display device 200. A user can easily control the display device 200 using the user terminal 100.

Hereinafter, referring to FIGS. 2 and 3, the user terminal 100 for controlling the display device 200 will be described in detail.

Figure 2:
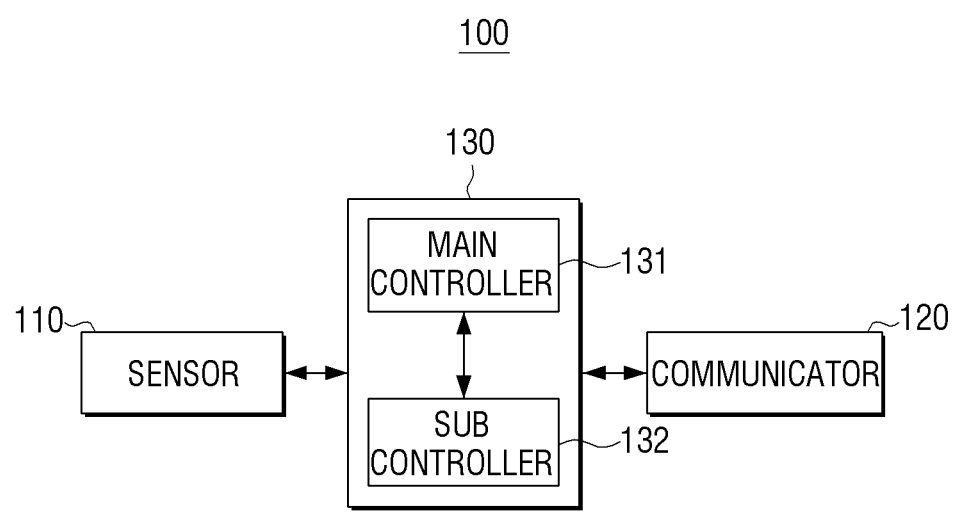
FIG. 2 is a block diagram schematically illustrating the configuration of a user terminal for controlling a display device according to an exemplary embodiment.

FIG. 2 is a block diagram schematically illustrating the configuration of the user terminal 100 according to an exemplary embodiment.

The user terminal 100 includes a detector 110, a communicator 120, and a controller 130.

The detector 110 is a component for detecting the presence of a user or a user interaction. In particular, the detector 110 may include a plurality of detection sensors to detect that a user is present within a predetermined distance from the user terminal 100. The detector 110 may sense illumination change, user grasping, user proximity, a user's touch input, and motion of the user terminal 100.

The communicator 120 is a component that performs communication with various types of external devices including the display device 200 or external servers according to various types of communication methods. That is, the communicator 120 may include various types of communication modules to perform communication with the external devices including the display device 200 or external servers.

In particular, the communicator 120 may receive event occurrence information. That is, the communicator 120 may receive the event occurrence information according to detection results of the display device 100.

The controller 130 includes a main controller 131 and a sub-controller 132. The main controller 131 is a component that controls the entire operation of the user terminal 100. In particular, the power of the main controller 131 is turned on while the user terminal 100 is in a normal mode or a standby mode, and the power of the main controller 131 is turned off while the user terminal 100 is in a sleep mode.

Further, if a predetermined event occurs while the user terminal 100 is in the standby mode, the main controller 131 may change a mode of the user terminal 100 to the sleep mode through turning off the power of the main controller 131.

Specifically, if a predetermined event occurs, the main controller 131 may store an operating state and various kinds of information in a volatile memory or a flash memory, turn off the power of the main controller 131, and transmit information indicating that the mode of the user terminal is changed to the sleep mode to the sub-controller 132. In accordance with a command of the main controller 131, the sub-controller 132 changes the mode of the user terminal 100 to the sleep mode through turning off the power of the main controller 131.

The predetermined event may correspond to a case in which a the presence of a user is detected within a predetermined threshold distance, a change in illumination outside a threshold range is detected, a change in temperature outside a threshold range is detected, and sound or audio input above a threshold level are not received from the display device 200 through the communicator 120 for a predetermined threshold period of time.

The sub-controller 132 is always in a power-on state regardless of a power mode of the user terminal 100, and may control the user terminal 100 while the user terminal 100 is in the sleep mode. In particular, if the event occurrence information is received through the communicator 120 while the user terminal 100 is in the sleep mode, the sub-controller 132 may change the mode of the user terminal 100 to the standby mode. Specifically, the sub-controller 132 may change the mode of the user terminal 100 from the sleep mode to the standby mode by applying of the power to the main controller 131.

The user terminal 100 may include the volatile memory, and the sleep mode may be any one of a second sleep mode in which the power of the volatile memory is turned on or a first sleep mode in which the power of the volatile memory is turned off.

Accordingly, if the sub-controller 132 receives the environmental change detection results from the display device 200 through the communicator 120 while the user terminal 100 is in the first sleep mode in which the power of the volatile memory is turned off, the sub-controller 132 may operate to change the mode of the user terminal 100 to the second sleep mode by turning on the power of the volatile memory.

The event for the sub-controller to receive the environmental change detection results may be to receive at least one of detecting a change in illumination outside a threshold range, detecting a change in outside a threshold range, or a sound input above a threshold level from the display device 200 through the communicator 120.

Further, if the event for the sub-controller to receive the user detection results from the display device 200 through the communicator 120 occurs while the user terminal 100 is in the second sleep mode, the sub-controller 132 may change the mode of the user terminal 100 to the standby mode through operating to turn on the power of the main controller 131.

Specifically, the event for the sub-controller to receive the user detection results may include at least one of detecting the presence of a user within a predetermined distance, the display device being powered on, or receiving a pre-registered user voice input from the display device 200 through the communicator 120.

Figure 3:
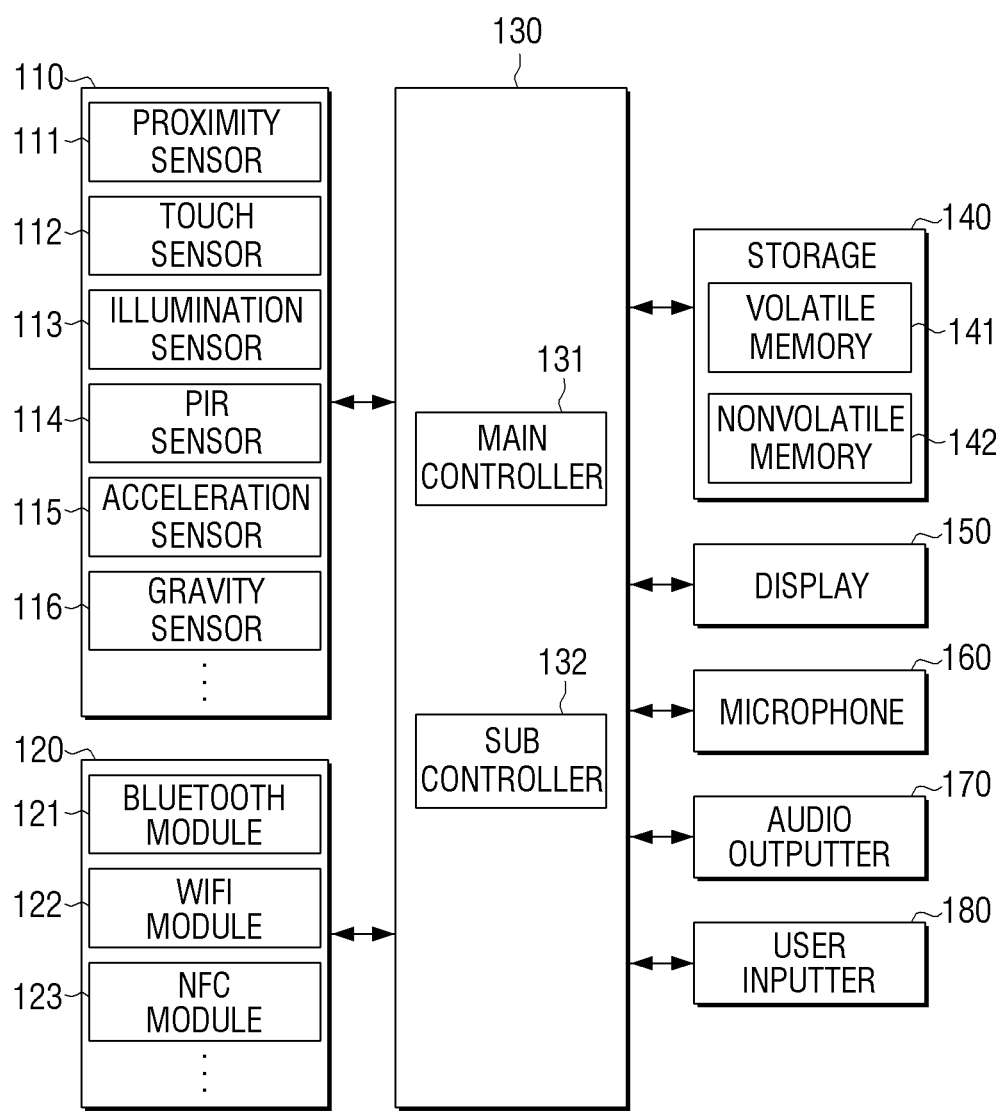
FIG. 3 is a block diagram illustrating in detail the configuration of a user terminal for controlling a display device according to an exemplary embodiment.

FIG. 3 is a diagram illustrating in detail the configuration of the user terminal 100 according to an exemplary embodiment. As illustrated in FIG. 3, the user terminal 100 may include a detector 110, a communicator 120, and a controller 130, and may further include a storage 140, a display 150, a microphone 160, an audio outputter 170, and a user inputter 180.

FIG. 3 illustrates various kinds of components of the user terminal 100 that may provide different functions of the user terminal, such as a standby mode function, an instant booting function, a display device control function, a user voice recognition function, a communication function, a moving image reproduction function, and a display function. According to exemplary embodiments, the components illustrated in FIG. 3 may be partially omitted or modified, or other constituent elements may be added thereto. Duplicate explanation of the contents as described previously will not be repeated.

The detector 110 may include a plurality of detection sensors for detecting a user or a user interaction. Specifically, the detector 110 may include a proximity sensor 111, a touch sensor 112, an illumination sensor 113, a passive infrared (PIR) sensor 114, an acceleration sensor 115, and a gravity sensor 116.

The proximity sensor 111 is a component for detecting a user who approaches the user terminal 100. For example, the proximity sensor 111 may detect that a user is present and located within a close distance of about 30 to 40 cm from the user terminal 100. This range of about 30 to 40 cm is merely exemplary, and in other exemplary embodiments proximity sensor 111 may be configured to detect a user's presence when the user is located at different distances, including distances greater than or less than 30 to 40 cm from the user terminal 100.

Specifically, the proximity sensor 111 may detect the existence of the user by using the force of an electromagnetic field without requiring physical contact between the user and the user terminal 100. The proximity sensor 111 may be implemented in various types, such as high-frequency oscillation type, a capacitance type, a magnetic type, a photoelectric type, and an ultrasound type, according to their detection principles.

The touch sensor 112 is a constituent element for detecting a user's touch on the user terminal 100. The touch sensor 112 may be a resistive touch sensor or a capacitive touch sensor.

The resistive touch sensor may detect the user's touch by sensing the pressure that the user applies to the user terminal 100. The capacitive touch sensor may detect a user's touch by sensing a capacitance change that is generated when a part of a user's body, such as a finger, comes in contact with the user terminal 100. However, the resistive or capacitive touch sensor is merely exemplary, and the kind and the sensing method of the touch sensors are not limited thereto.

The illumination sensor 113 is a constituent element for measuring brightness of the surroundings. That is, the illumination sensor 113 may measure the brightness of a space in which the user terminal 100 is positioned.

The PIR sensor 114 is a component for detecting a user through sensing of infrared radiation. Specifically, a human body emits infrared radiation of about 5 to 30 µm. Accordingly, the PIR sensor 114 may detect the presence of a user by detecting the heat change that is caused by infrared radiation emitted from the human body.

The acceleration sensor 115 is a component for detecting motion of the user terminal 100. Specifically, the acceleration sensor 115 may measure the motion of the user terminal 100 through measurement of dynamic forces, such as acceleration, vibration, or impact of an object.

That is, a user may mainly holds and uses the user terminal 100 with his or her hands. Accordingly, while the user uses the user terminal 100, the user terminal 100 occurs is moved. If a motion of the user terminal 100 is detected through the acceleration sensor 115, the user terminal 100 may determine that the user is using the user terminal 100.

The gravity sensor 116 is a component for detecting the direction of gravity. That is, the detection results of the gravity sensor 116 may be used to determine the motion of the user terminal 100 together with the detection results of the acceleration sensor 115. Further, through the gravity sensor 116, a direction in which the user terminal 100 is grasped may be determined.

In addition to the above-described sensors, the detector 110 may further include various kinds of sensors, such as a gyroscope sensor, a geomagnetic sensor, an ultrasound sensor, and an RF sensor, to detect a user or a user's interaction.

The communicator 120 is a component that performs communication with the display device 200, various types of external devices, or an external server according to various types of communication methods. That is, the communicator 120 may include various kinds of communication modules to perform communication with the display device 200, the external device, or the external server.

The communicator 120 may include a Bluetooth module 121, a WiFi module 122, and an NFC module 123. However, this is merely exemplary, and the communicator 120 may further include various kinds of communication modules, such as wireless communication modules.

In this case, the Bluetooth module 121, the WiFi module 122, and the NFC module 123 respectively perform communication using a Bluetooth method, a WiFi method, and an NFC method, respectively. Among these, the NFC module 123 refers to a module that operates in an NFC (Near Field Communication) method that uses 13.56 MHz band among various RF-ID frequency bands, such as 135 kHz, 13.56 MHz, 433 MHz, 860~960 MHz, and 2.45 GHz. In the case of using the Bluetooth module 121 or the WiFi module 122, various kinds of connection information, such as a SSID and a secession key, may be first transmitted and received to establish a communication connection, and then various kinds of information are transmitted and received. The wireless communication module refers to a module that performs communication according to various communication standards, such as IEEE, Zigbee, 3G ($3^{rd}$ Generation), 3GPP ($3^{rd}$ Generation Partnership Project), and LTE (Long Term Evolution).

In particular, the communicator 120 may perform communication with the display device 200 according to the various communication methods as described above. Specifically, the communicator 120 may receive various kinds of results that are detected by a sensor 220 included in the display device 200. Further, the communicator 120 may transmit various kinds of control commands that are input to control the display device 200 to the display device 200.

Further, the communicator 120 may receive event occurrence information. That is, the communicator 120 may receive environmental change detection results or user detection results from the display device 200.

Storage 140 stores therein various modules for driving the user terminal 100. Specifically, software that includes a base module, a sensing module, and a presentation module may be stored in storage 140.

The base module is a basic module that processes signals transferred from hardware included in the user terminal 100 and transfers the processed signals to a higher layer module. The base module includes a storage module, a security module, and a network module. The storage module is a program module that manages a database (DB) or registries. A main CPU may read out various kinds of data by accessing the database in storage 140 using the storage module. The security module is a program module that supports hardware certification, request permission, and secure storage. Further, the network module is a module for supporting a network connection and may include a DNET module and an UPnP module.

The sensing module is a module which collects information from various kinds of sensors included in the detector 110 and analyzes and manages the collected information. The sensing module may include a head direction recognition module, a face recognition module, a voice recognition module, a motion recognition module, and an NFC recognition module.

The presentation module is a module for constructing a display screen. The presentation module includes a multimedia module for reproducing and outputting multimedia content and a user interface (UI) rendering module for performing UI and graphic processing. The multimedia module may include a player module, a camcorder module, and a sound processing module. Accordingly, the multimedia module reproduces various kinds of multimedia content, generates and reproduces an image and sound. The UI rendering module may include an image compositor module combining image, a coordinate combination module combining and generating coordinates on a screen on which the images are to be displayed, an XII module receiving various kinds of content from the hardware, and a 2D/3D UI tool kit providing a tool for constructing a 2D or 3D UI.

The various kinds of software modules as described above may be partially omitted, modified, or added according to the kind and the characteristics of the display device 100. For example, a position-based module that supports a position-based service in interlocking with the hardware, such as a global positioning system (GPS) module, may be further included.

Storage 140 may include a volatile memory 141. If the user terminal 100 enters into a sleep mode for reducing power consumption, the volatile memory 141 may store a hardware operational state corresponding to a mode entrance time. Accordingly, the user terminal 100 may preserve the contents stored in the volatile memory 141, such as a dynamic random access memory (DRAM), using a self-refresh operation of a double data rate (DDR) memory of storage 140 when the user terminal is in the sleep mode. Further, if a predetermined event occurs and the mode of the user terminal 100 is changed to a standby mode, the user terminal 100 can quickly preserve the previous operating state before entering the sleep mode.

Further, storage 140 may include a nonvolatile memory 142. That is, if a user or a user interaction is not detected within a predetermined threshold period of time after the mode of the user terminal 100 is changed from the standby mode to the sleep mode, the contents stored in the volatile memory 141 is moved to the nonvolatile memory under the control of the main controller 131.

Display 150 is a component for displaying an image. In particular, display 150 of the user terminal 100 may display various kinds of UIs for easily controlling the display device 200. For example, the display 150 may display a UI that shows information about settings of the display device 200 at a time when the user uses the display device 200. That is, the display 150 may display a UI that shows information, such as a provider of an image that is displayed on the display device 200, a producer, a type, and characters, and setting information, such as brightness of the display device 200, channels, and sound.

Further, the display 150 may be implemented as a touch screen to receive an input of a user command for controlling the display device 200.

Microphone 160 is a component for receiving surrounding sound of the user terminal 100. In particular, the microphone 160 may receive an input of a user's voice. Accordingly, in response to a user voice input to the user terminal 100 through the microphone 160 and the voice input being matched with a preset user voice, the user terminal 100 may determine that the user is present near the user terminal.

Further, the user terminal 100 may receive a voice input through the microphone 160 as a control command for controlling the display device 200.

The audio outputter 170 is a component that outputs not only various kinds of audio data but may also output various kinds of alarm sounds or voice messages. In this case, the audio outputter 170 may be implemented as a speaker. However, this is merely exemplary, and the audio outputter 170 may be implemented as an audio terminal.

The user inputter 180 is a component for receiving an input of a user command. The user inputter 180 may receive an input of a user command for controlling the entire operation of the display device 200. In particular, as described above, the user inputter 180 may be implemented as a touch screen to receive an input of a control command through a user's touch, or may be implemented by a microphone to receive an input of a control command through a user's voice. The user inputter 180 may also be implemented by a plurality of push buttons provided outside the user terminal 100.

The controller 130 includes a main controller 131 and a sub-controller 132. The main controller 131 is a component for controlling the entire operation of the user terminal 100.

In particular, the main controller 131 may be powered on while the user terminal 100 is in a normal mode or a standby mode, and may be powered off while the user terminal 100 is in a sleep mode.

Further, in the case where a predetermined event occurs while the user terminal 100 is in the standby mode, the main controller 131 may turn off the power of the main controller 131 to change the mode of the user terminal 100 to the sleep mode.

If a predetermined event occurs, the main controller 131 may store an operating state and various kinds of information in the volatile memory 141 or a flash memory, turn off the power of the main controller 131, and transmit information to the sub-controller 132 that the mode of the user terminal 100 is changed to the sleep mode. In accordance with a command of the main controller 131, the sub-controller 132 changes the mode of the user terminal 100 to the sleep mode by turning off the power of the main controller 131.

The predetermined event may indicate that a user is detected within a predetermined threshold distance, an illumination change outside a threshold range is detected, a temperature change outside a threshold range is detected, and a sound input above a threshold level are not received from the display device 200 through the communicator 120 for a predetermined threshold period of time.

In a normal mode, all components of the user terminal 100 are in a power-on state. In this case, if the user terminal 100 is not used for a predetermined time, the main controller 131 may turn off the power of the display 150. That is, the standby mode may be a state where the communication modules except for the display 150 or the Bluetooth module 121, such as the WiFi module 122, are in a power-off state.

If the mode of the user terminal 100 is changed to the standby mode and the user detection information is not received from the display device 200 through the communicator 120 for a predetermined threshold time, the user terminal 100 may determine that a user who intends to use the display device 200 and the user terminal 100 does not exist. Accordingly, the main controller 131 may store the hardware operating state in the volatile memory 141 and may transfer information to the sub-controller 132 that the mode of the user terminal 100 is changed to the sleep mode. Then, the power of the main controller 134 is turned off.

If the pre-registered user voice or the user detection results within in the threshold distance are not received from the display device 200 for the threshold period of time, the user terminal 100 may determine that the user does is not present within the area of the display device 200 and/or the user terminal 100 (e.g., a room in which the display device 200 is located, within a home in which the display device 200 is located, or other region or space).

The user terminal 100 may also determine that the user is not present in response to information that the power of the display device is turned off being received from the display device 200.

As a result, if a user who intends to use the user terminal 100 or the display device 200 is not detected through the various methods, the mode of the user terminal 100 may be changed from the standby mode to the sleep mode.

On the other hand, if an environmental change detection event is not received from the display device 200 after the mode is changed to the sleep mode in which the power of the main controller 131 is turned off and various kinds of operating information are stored in the volatile memory 141, the user terminal 100 may turn off the power of the volatile memory 141.

For example, if the power of the main controller 131 is turned off and sound input information above a threshold level is not received from the display device 200 through the communicator 120 for a predetermined period of time, the sub-controller 132 may apply the power to the main controller 131. In this case, the main controller 131 may operate to move the operating information stored in the volatile memory 141 to the flash memory to store the operating information in the flash memory. Further, the main controller 131 may transmit the information to the sub-controller 132 that the power of the main controller 131 and the volatile memory 141 is turned off. The sub-controller, which has received the information from the main controller 131, may turn off the power of the main controller 131 and the volatile memory 141. If it is determined that the user's presence is not sensed in a space in which the user terminal 100 and the display device 200 are located through various methods, in addition to the case where the sound input information above the threshold level is not received, the mode of the user terminal 100 may be changed to the sleep mode, in which the power of the main controller 131 and the volatile memory 141 is turned off.

On the other hand, the sub-controller 132 is always in a power-on state regardless of the power mode of the user terminal 100, and may control the user terminal 100 while the user terminal 100 is in the sleep mode. In particular, if the event occurrence information is received through the communicator 120 while the user terminal 100 is in the sleep mode, the sub-controller 132 may change the mode of the user terminal 100 to the standby mode. Specifically, the sub-controller 132 may change the mode of the user terminal 100 from the sleep mode to the standby mode by applying of the power to the main controller 131.

The user terminal 100 may include the volatile memory 141, and the sleep mode may be any one of a second sleep mode in which the power of the volatile memory is turned on and a first sleep mode in which the power of the volatile memory is turned off.

Accordingly, if the sub-controller 132 receives the environmental change detection results, such as a change in illumination outside the threshold range, a change in temperature change outside the threshold range, and sound input above the threshold level, through the communicator 120 while the user terminal 100 is in the first sleep mode in which the power of the volatile memory 141 is turned off, the sub-controller 132 may operate to change the mode of the user terminal 100 to the second sleep mode by applying the power to the volatile memory 141.

If the illumination change or the temperature change outside the threshold range is sensed through the illumination sensor or the temperature sensor included in the display device 200, the user terminal 100 may receive the sensing results from the display device 200 through the communicator 120.

Further, if sound above the threshold level is input through the microphone included in the display device 200, the user terminal 100 may receive the sound input results from the display device 200 through the communicator 120.

That is, when a user enters into a space where the display device 200 and the user terminal 100 are used, such as a home or an office, he/she may adjust heating or cooling, turn lighting on or off, or emit sound by speaking. Accordingly, in the case where the temperature or the illumination intensity is changed or sound that exceeds a specified noise level, for example, more than 40 dB, is input, the display device 200 may determine that a user is present.

As a result, if the sensing results are received from the display device 200 through the communicator 120, the user terminal 100 may operate to change the mode of the user terminal 100 to the second sleep mode by applying power to the volatile memory 141.

On the other hand, if the user detection results are received from the display device 200 while the user terminal 100 is in the second sleep mode, the sub-controller 132 may operate to change the mode of the user terminal 100 to the standby mode by turning on the power of the main controller 131. For example, if the presence of a user is detected within the predetermined distance from the display device 200, the pre-registered user voice input is received through the communicator 120, or the information that the power of the display device 200 is turned on is received through the communicator 120, the user terminal 100 may determine that the user detection results are received.

That is, if the pre-registered user voice is input through the microphone provided on the display device 200, the display device 200 may determine that a user who intends to use the display device 200 is approaching the display device 200. Further, even in the case where the user's presence is detected within the threshold distance using the PIR sensor or the proximity sensor, the display device 200 may determine that a user is approaching the display device 200.

Accordingly, the display device 200, which has detected the user's proximity, may transmit the user proximity results to the user terminal 100. The user terminal 100, which has received the user proximity results, may change the mode of the user terminal 100 to the standby mode through turning on the power of the main controller 131.

Further, if the power of the display device 200 is turned on through a separate control device (e.g., a smart phone) rather than the user terminal 100 or using a separate power button provided on the display device 200, the user terminal 100 may receive the information that the power of the display device 200 is turned on through the communicator 120. Accordingly, the user terminal 100, which has received the information that the power of the display device 200 is turned on, may change the mode of the user terminal 100 to the standby mode through turning on the power of the main controller 131.

Figure 4:
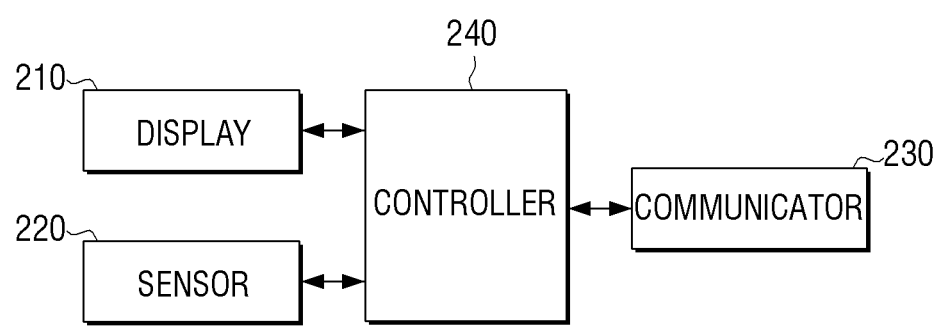
FIG. 4 is a block diagram illustrating the configuration of a display device according to an exemplary embodiment.

On the other hand, FIG. 4 is a block diagram illustrating the configuration of a display device 200 that is a control target of a user terminal 100 according to an exemplary embodiment.

The display device 200 includes a display 210, a detector 220, a communicator 230, and a controller 240.

The display 210 is a component for displaying an image. The display 210 may display content that is received through a broadcasting channel. That is, the display device 200 may receive various kinds of broadcasting signals transmitted from broadcasting stations through a radio frequency (RF) communication network or may receive content from various kinds of servers through an internet protocol (IP) network. Accordingly, the display 210 may display received content.

Further, the display 210 may display various kinds of UIs. That is, the display 210 may display a UI for controlling settings of the display device 200 or environments under the control of the user terminal 100.

The detector 220 is a component for detecting a user or a user interaction. Specifically, the detector 220 may include various sensors, such as an illumination sensor 221, a temperature sensor 222, a microphone 223, a PIR sensor 224, and a proximity sensor 225, and may sense the presence of a user near the display device 200.

Specifically, the display device 200 may sense a change in illumination change through the illumination sensor 221. If the illumination intensity is abruptly changed, the display device 200 may determine that a user is present in the area where the display device 200 is located. However, depending on circumstances, the display device 200 may determine that a user is not present if the illumination intensity is abruptly changed. In other words, the display device 200 may discriminate between illumination change events that are indicative of a user's presence and illumination change events that are not, such as, for example, the change in illumination in a room in which the display device 200 is located that occurs in the morning at sunrise.

The temperature sensor 222 is a component for detecting temperature change in the area where the display device 200 is located. That is, when a user enters into a space in which the display device 200 is located, he/she may change the temperature of the surroundings through adjusting the cooling/heating. Accordingly, if an abrupt change of the ambient temperature is detected through the temperature sensor 222, the display device 200 may determine that a user is present in the area where the display device 200 is located. However, depending on circumstances, the display device 200 may determine that the user is not present in the case where the temperature is abruptly changed, such as, for example a change in heating or cooling that corresponds to a pre-set adjustment of a thermostat.

The microphone 223 is a component for receiving an input of sound including a user's voice. That is, if sound that exceeds the threshold level is input through the microphone 223, the display device 200 may determine that a user is present in the space in which the display device 200 is located, such as a home or an office. If a person is present in the space, indoor noise of about 40 dB may be generated. Accordingly, if sound of which the level is equal to or higher than a predetermined level is input through the microphone 223, the display device 200 may determine that a person is present in the space, such as a home or an office.

Further, if sound having a level that is equal to or lower than the threshold level is continuously input through the microphone 223, the display device 200 may determine that a person is not present in the space in which the display device 200 is located.

On the other hand, if it is determined through analysis that the user voice that is input through the microphone 223 is a user voice that has been pre-registered in the display device 200, the display device 200 may determine that a user who intends to use the display device 200 and the user terminal 100 approaches.

The PIR sensor 224 is a component for sensing a user through sensing of infrared radiation. Specifically, a human body emits infrared radiation of about 5 to 30 μm. Accordingly, the PIR sensor 224 may sense a user through sensing of heat that results from the infrared radiation emitted from the human body.

The proximity sensor 225 is a component for sensing a user who approaches the user terminal 100. For example, the proximity sensor 225 may sense the presence of the user in a close distance of about 30 to 40 cm from the user terminal 100. However, the range of about 30 to 40 cm is merely exemplary and in other exemplary embodiments other ranges for detecting the presence of a user may be employed.

As described above, using various kinds of sensors, the display device 200 may detect the change of the surrounding environment and the presence of the user.

The communicator 230 is a component that performs communication with various types of external devices or external servers according to various types of communication methods. That is, the communicator 230 may include various kinds of communication modules, such as a WiFi module, a Bluetooth module, a wireless communication module, and an NFC module, to perform communication with the external devices. In this case, the WiFi module, the Bluetooth module, and the NFC module perform communication in a WiFi method, a Bluetooth method, and an NFC method, respectively. Among them, the NFC module refers to a module that operates in an NFC (Near Field Communication) method that uses 13.56 MHz band among various RF-ID frequency bands, such as 135 kHz, 13.56 MHz, 433 MHz, 860~960 MHz, and 2.45 GHz. In the case of using the WiFi module or the Bluetooth module, various kinds of connection information, such as a SSID and a secession key, are first transmitted and received to establish a communication connection, and then various kinds of information are transmitted and received. The wireless communication module refers to a module that performs communication according to various communication standards, such as IEEE, Zigbee, 3G ($3^{rd}$ Generation), 3GPP ($3^{rd}$ Generation Partnership Project), and LTE (Long Term Evolution).

In particular, the communicator 230 may perform communication with the user terminal 100 according to the various communication methods as described above. Specifically, the communicator 230 may transfer the results that are detected through the sensor 220 to the user terminal 100. For example, if a user who present in the area where the display device 200 is located is detected through the sensor 220, the communicator 230 may transmit the user detection results to the user terminal 200.

Further, if an illumination change is detected through the illuminations sensor, the communicator 230 may transmit the sensing results to the user terminal 200.

On the other hand, the communicator 230 may receive a control command from the user terminal. That is, the communicator 230 may receive various kinds of control commands (i.e., channel change, sound change, or various kinds of setting changes) input through the user terminal 100 according to the various communication methods as described above.

The controller 240 is a component for controlling the entire operation of the display device 100. That is, the controller 240 controls the entire operation of the display device 100 using various kinds of programs stored in a storage (not illustrated).

The controller 240 includes a random access memory (RAM), a read only memory (ROM), a graphic processor, a main CPU, first to n-th interfaces, and a bus. In this case, the RAM, the ROM, the graphic processor, the main CPU, and the first to n-th interfaces may be connected to one another through the bus.

A command set for system booting is stored in the ROM. If a turn-on command is input and the power is supplied, the main CPU copies the operating system (O/S) stored in the storage into the RAM according to the command stored in the ROM, and boots the system through execution of the O/S. Upon completing the booting operation, the main CPU copies various kinds of application programs stored in the storage into the RAM, and perform various kinds of operations through execution of the application programs.

The graphic processor generates a screen that includes various objects, such as icons, images, and texts, using an operator and renderer. The operator operates attribute values, such as coordinate values, shapes, sizes, and colors of respective objects to be displayed according to a layout of the screen. The renderer generates screens of various layouts that include objects based on the attribute value operated by the operator. The screen generated by the renderer is displayed on a display region of the display 210.

The main CPU accesses the storage, and performs booting using the O/S stored in the storage. Further, the main CPU performs various operations using various kinds of programs stored in the storage, content, and data.

The first to n-th interfaces are connected to the various kinds of constituent elements as described above. One of the interfaces may be a network interface that is connected to an external device through a network.

Hereinafter, referring to FIGS. 5 to 8, a method for changing a power mode of the user terminal 100 will be described in detail.

Figure 5:
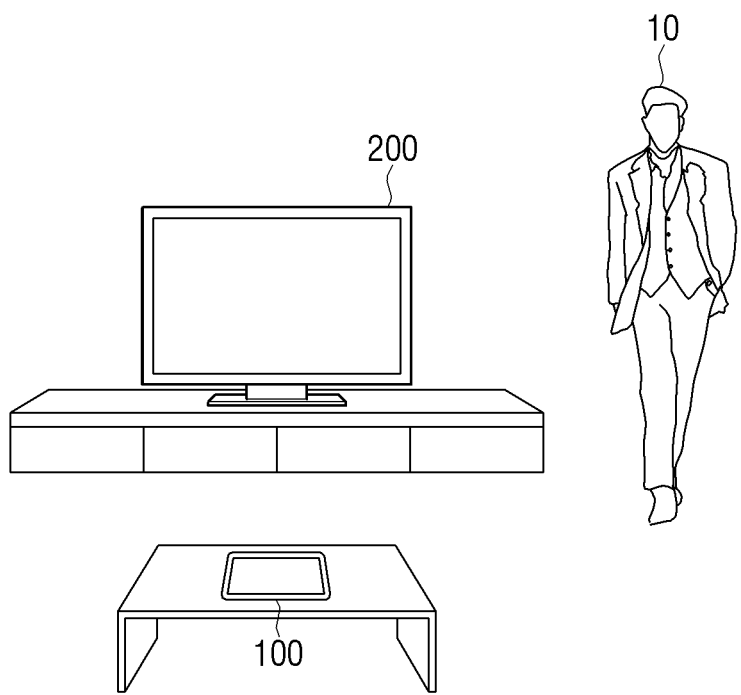
FIG. 5 is a diagram illustrating a case in which a display device according to an exemplary embodiment senses a user.
Figure 6:
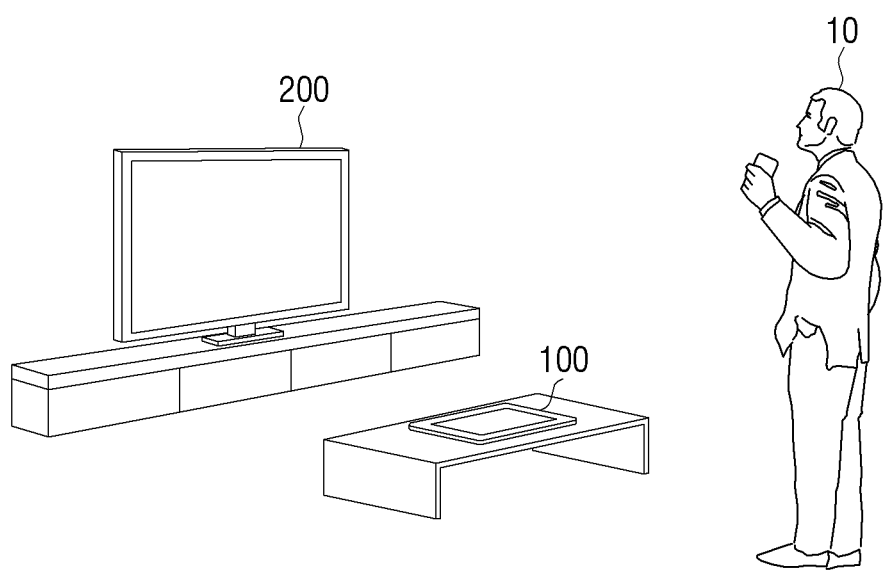
FIG. 6 is a diagram illustrating a case in which a user terminal according to an exemplary embodiment senses a user.

FIGS. 5 and 6 are diagrams explaining features of a mode change of a user terminal that occurs if an environmental change and user presence are detected according to an exemplary embodiment. That is, if a user is detected in the area of the user terminal 100 or the display device 200, it may be expected that the user will use the user terminal 100 in order to use the display device 200. Accordingly, the sub-controller 132 of the user terminal 100, which is operating in the sleep mode, may apply the power to the volatile memory 141.

Specifically, FIG. 5 is a diagram illustrating a case where a display device 200 according to an exemplary embodiment detects an illumination change. For example, when the user enters into a space in which the display device 200 located, he/she may turn on lighting in the space. As the lighting is turned on, the display device 200 detects the illumination change using the illumination sensor 221.

The display device 200 may transmit the detection results to the user terminal 100 through the communicator 230. That is, the display device 200 may transmit the user sensing results using a communication method, such as Bluetooth or WiFi.

The user terminal 100 receives the environmental change information through the communicator 120, and the sub-controller 132 may apply the power to the volatile memory 141. On the other hand, if the sub-controller 132 applies the power to the volatile memory 141, and the user detection results are not received through the communicator 120 or information that the power of the display device 100 is turned on is not received through the communicator 120 for a predetermined time, the user terminal 100 may turn off the power of the volatile memory 141 again.

In contrast, if the sub-controller 132 applies the power to the volatile memory 141, and information that the power of the display device 100 is turned on is received through the communicator 120 within the predetermined time or the user detection results are received indicating the user is present within the threshold distance of the display device 100, the sub-controller may apply the power to the main controller 131. That is, the mode of the user terminal 100 may be changed to the standby mode.

Specifically, FIG. 6 is a diagram illustrating a case where the display device 200 detects a user according to an exemplary embodiments. As illustrated in FIG. 6, the display device 200 may detect the user who is present within a predetermined distance from the display device 200 using the PIR sensor 224 or the proximity sensor 225.

The display device 200, which detects the user proximity, may transmit the user sensing results to the user terminal 100 through the communicator 230. In this case, the sub-controller 132 of the user terminal 100, which has received the user detection results, may change the mode of the user terminal 100 to the standby mode through applying power to the main controller 131.

If the user or the user interaction is continuously sensed through the user terminal 100, which has been changed to the standby mode, the main controller 131 may apply the power to the display 150.

Figure 7:
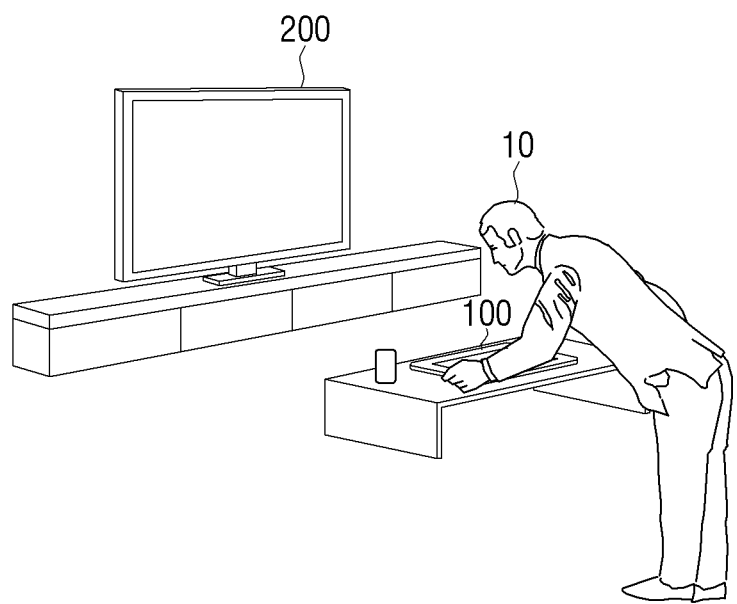
FIG. 7 is a diagram illustrating a case in which a user terminal according to an exemplary embodiment senses user's grasping.

That is, as illustrated in FIG. 7, at a moment where a user's behavior for operating the user terminal 100 is input, the user terminal 100, which is changed to the standby mode, may apply the power to the entire configuration to change the mode to a normal mode according to an exemplary embodiment.

On the other hand, FIG. 8 is a diagram explaining various modes of a user terminal for controlling a display device according to an exemplary embodiment.

As illustrated in FIG. 8, the user terminal 100 may operate in one of a normal mode 800, a standby mode 810, a sleep mode 820, a deep sleep mode 825, and a power-off mode 830.

The normal mode 800 refers a state in which the user terminal 100 can be solely used and the display device 200, such as a TV, can be controlled using the user terminal 100. Accordingly, in the case where the user terminal 100 operates in the normal mode 800, the power is applied to all components included in the user terminal 100.

The standby mode 810 refers to a state in which at least one of the display 150 and the WiFi module 122 is turned off if the user terminal 100 is not used for a threshold period of time.

Specifically, if the user command for controlling the display device 200 is not input for a threshold period of time (e.g., 15 seconds), the user terminal 100 may be controlled to enter the standby mode 810 in order to turn off the power of the display 150.

If the power of the display 150 is turned off and the user command for controlling the display device 200 is not input again for a threshold period of time, the user terminal 100 may turn off the power of the WiFi module 122.

That is, in order to reduce the power consumption of the user terminal 100 while the user command is not input, the user terminal 100 may turn off the power of the display 150 and the WiFi module 122.

If the user detection information is not received from the display device 200 through the communicator 120 while the user terminal 100 operates in the standby mode 810, the user terminal 100 may determine that a user who intends to use the display device 200 and the user terminal 100 is not present. Accordingly, the user terminal 100 may turn off the power of the main controller 131.

If information indicating that the power of TV is turned off is received through the communicator 120 while the standby mode 810 is maintained, or detection information of a user or a user proximity detected through the PIR sensor 224 or the proximity sensor 225 of the TV is not received through the communicator 120, the main controller 131 may operate to store the hardware operating state in the volatile memory 141. Further, the main controller 131 may transfer the information that the power of the main controller 131 is turned off to the sub-controller 132 and may turn off the power of the main controller 131. Accordingly, the mode of the user terminal 100 may be changed to the sleep mode 820.

On the other hand, if the mode of the user terminal 100 is changed to the sleep mode 820 and it is determined that a user is not present in a space, such as a home or an office, in which the display device 200 is located for the predetermined threshold time, the mode of the user terminal 100 may be changed to the deep sleep mode 825.

For example, if information that the sound input information exceeding a threshold level is not received from the display device 200 through the communicator 120 while operating in the sleep mode 820, the sub-controller 132 may apply the power to the main controller 131. In this case, the main controller 131 may operate to move various kinds of driving information stored in the volatile memory 141 to the flash memory to store the operating information in the flash memory. Further, the main controller 131 may transfer the information that the power of the main controller 131 and the volatile memory 141 is turned off to the sub-controller 132. The sub-controller 132, which has received the information, may turn off the power of the main controller 131 and the volatile memory 141, and the mode of the user terminal 100 may be changed to the deep sleep mode 825.

On the other hand, the power-off mode 830 refers to a mode in which the power of all the components except for the sub-controller 132 is turned off in the case where the power of the user terminal 100 is completely discharged or a power-off command of the user terminal 100 is input from a user.

Figure 9:
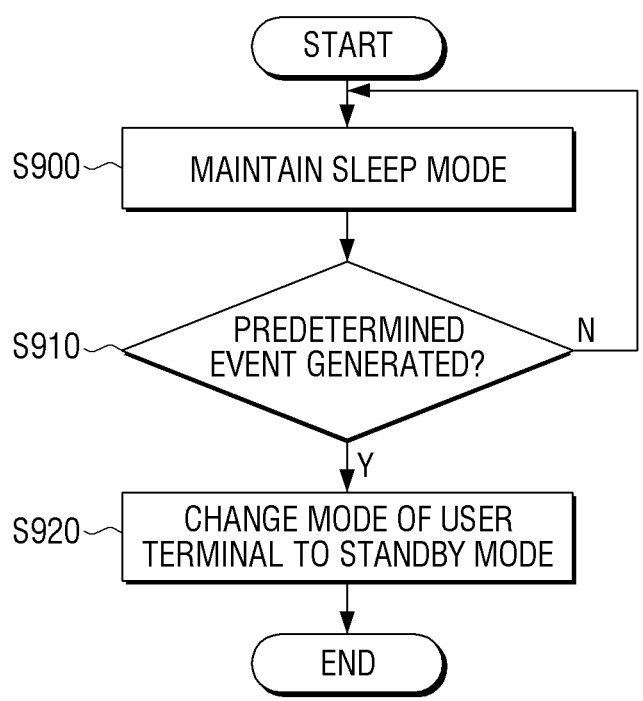
FIG. 9 is a flowchart illustrating a control method of a user terminal according to an exemplary embodiment.

FIG. 9 is a flowchart illustrating a control method of a user terminal 100 according to an exemplary embodiment. In particular, FIG. 9 is a flowchart illustrating a method in which the mode of the user terminal 100 is changed from the sleep mode to the standby mode.

If event occurrence information is received (S910-Y) while the user terminal 100 maintains (operates in) a sleep mode (S900), the user terminal 100 may sequentially apply a power to components, such as a volatile memory or a main controller, and thus the mode of the user terminal 100 may be changed from the sleep mode to the standby mode (S920).

Further, event occurrence information may include information that a display device 200 detects environmental change and information that user presence is detected. Specifically, in the case where the display device 200 transmits the results of detecting the illumination change and/or the temperature change over the threshold range to the user terminal 100, or in the case where the display device 200 transmits the results of detecting the user presence to the user terminal 100, the mode of the user terminal 100 may be changed from the sleep mode to the standby mode.

On the other hand, if the event occurrence information is not received (S910-N), the user terminal 100 stays in the sleep mode (S900).

Referring to sequential diagrams illustrated in FIGS. 10 and 11, a method in which the mode of the user terminal 100 is changed from the sleep mode to the standby mode according to an exemplary embodiment will be described in detail.

Figure 10:
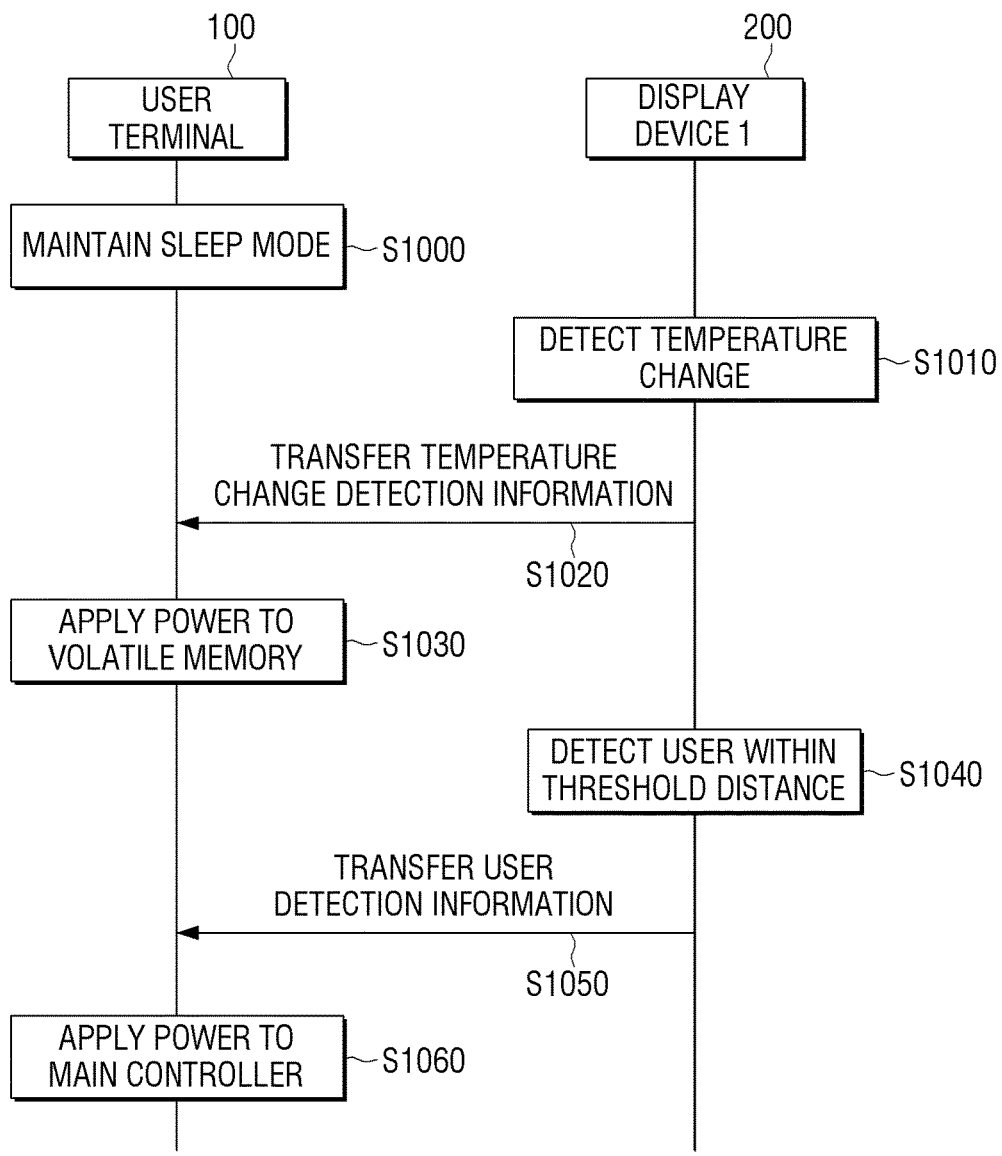
FIGS. 10 and 11 are sequential diagrams illustrating a control method of a user terminal according to an exemplary embodiment.

As illustrated in FIG. 10, if the display device 200 detects the temperature change (S1010) while the user terminal 100 maintains (operates in) the sleep mode (S1000), the user terminal 100 may receive the temperature change sensing information from the display device 200 (S1020).

The user terminal 100, which has received the temperature change detection information from the display device 200, applies the power to the volatile memory 200 (S1030). However, since the user terminal 100 only determines that the temperature change indicates that the user enters into the space in which the display device 200 and the user terminal 100 are located, the user terminal 100 applies the power only to the volatile memory and continues to operate in the sleep mode.

If the display device 200 detects the user who is present within the predetermined threshold distance (S1040), it transfers the user detection information to the user terminal 100 (S1050).

That is, if the display device 200 detects the presence of a user in the area of the display device 200 using the sensor, such as the proximity sensor or the PIR sensor, the user terminal 100 may receive user presence detection information from the display device 200.

If the user detection information is transferred (S1050), the user terminal 100 applies the power to the main controller (S1060). That is, the user terminal 100 may apply the power to the main controller to change the mode to the standby mode.

Figure 11:
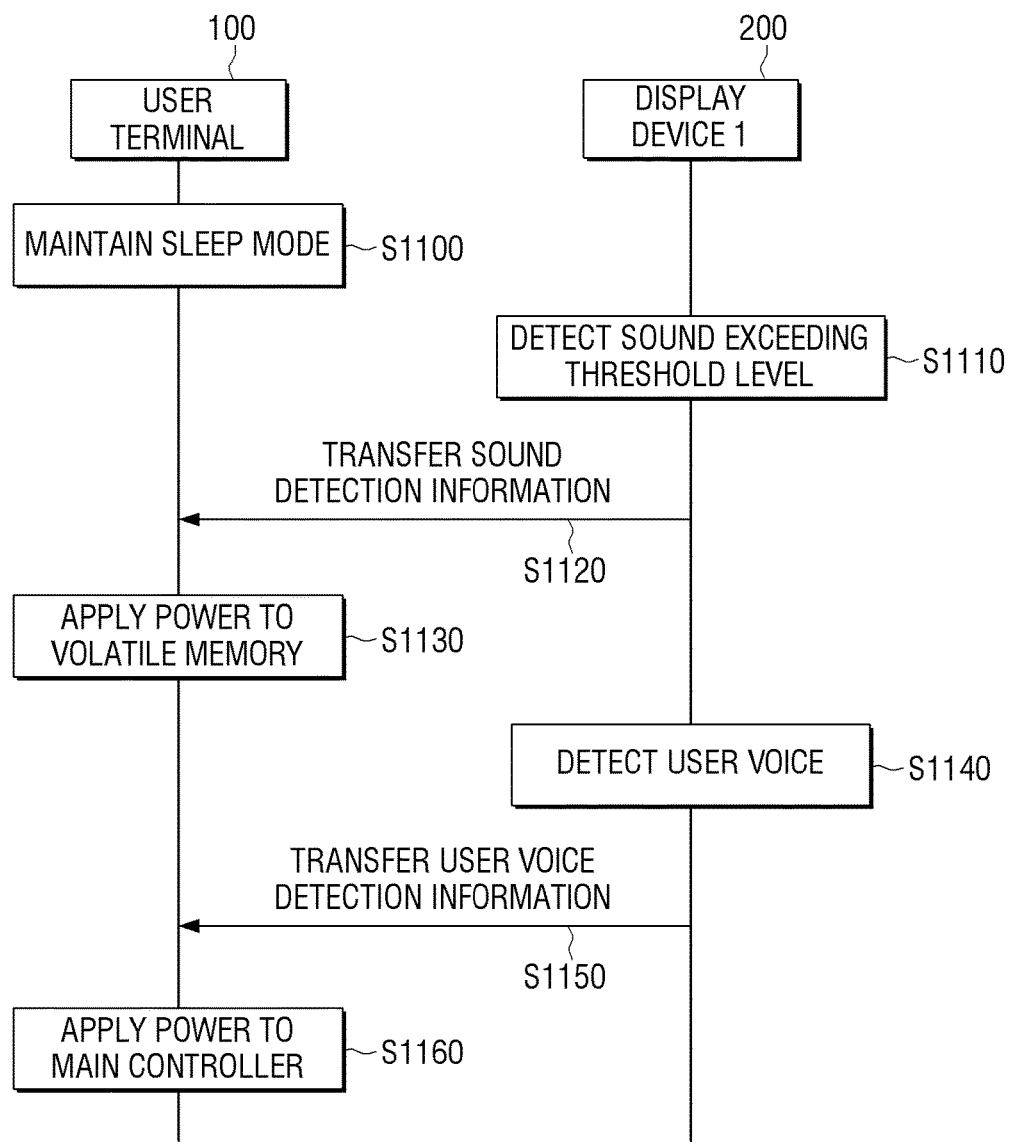

On the other hand, by the method as illustrated in FIG. 11, the mode of the user terminal 100 may be changed to the standby mode.

First, if the display device 200 detects sound exceeding the threshold level (S1110) while the user terminal 100 maintains (operates in) the sleep mode (S1100), the user terminal 100 may receive the sound detection information from the display device 200 (S1120).

The user terminal 100, which has received the sound detection information of the display device 200 from the display device 200, applies the power to the volatile memory (S1130). However, since the user terminal 100 detects only the information that the sound exceeding the threshold level of the display device 200 is sensed, it applies the power only to the volatile memory to stay in the sleep mode.

If the display device 200 detects the pre-registered user voice (S1140), the user terminal 100 receives the pre-registered user voice detection information from the display device 200 (S1150).

Then, the user terminal 100 applies the power to the main controller (S1160). That is, if the pre-registered user voice is input through the display device 200, the user terminal 100 may determine that the user who intends to use the display device 200 is present. Accordingly, the user terminal 100 may apply the power to the main controller to enter the standby mode. On the other hand, FIG. 12 is a flowchart illustrating a method for changing a mode of a user terminal 100 to a sleep mode according to an exemplary embodiment.

Figure 12:
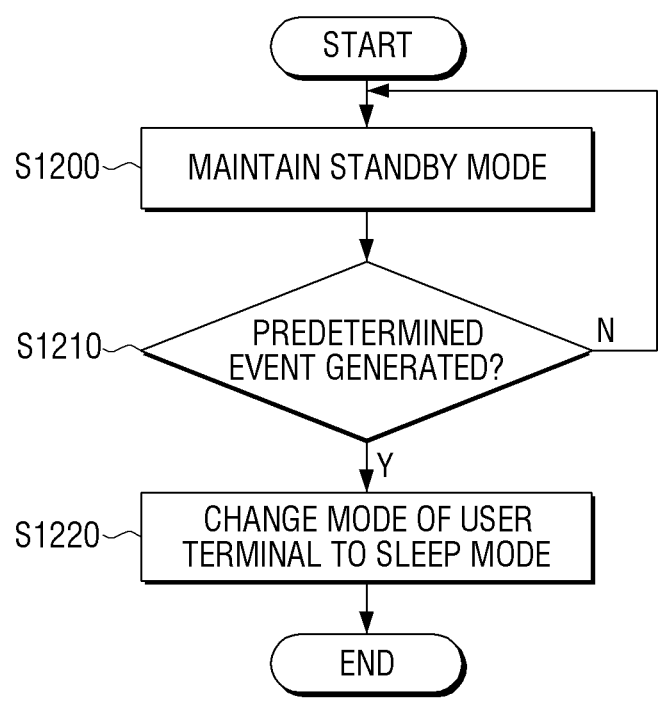
FIG. 12 is a flowchart illustrating a method for changing a mode of a user terminal to a sleep mode according to an exemplary embodiment.

As illustrated in FIG. 12, if it is determined that the predetermined event occurs (S1210-Y) while the user terminal 100 maintains (operates in) the standby mode (S1200), the mode of the user terminal 100 is changed to the sleep mode (S1220).

Specifically, if the predetermined event occurs, the user terminal 100 may store an operating state and various kinds of information in the non-volatile memory 142 or a flash memory, turn off the power of the main controller 131, and transmit information that the mode of the user terminal 100 is changed to the sleep mode to the sub-controller 132. In accordance with a command of the main controller 131, the sub-controller 132 changes the mode of the user terminal 100 to the sleep mode through turning off the power of the main controller 131.

The predetermined event may include the communicator 120 not receiving from the display device 200 for a predetermined threshold time at least one of information indicating the user is detected within the predetermined threshold distance, information indicating an illumination change outside the threshold range is detected, information indicating the temperature change outside the threshold range is detected, and information indicating the sound input exceeding the threshold level.

According to the control method of the user terminal 100 as described above, the user can reduce the number of times and/or the frequency of charging the user terminal due to improved power management of the user terminal, and can use the user terminal that immediately reacts to user interaction.

The control method of the display device according to various exemplary embodiments as described above may be coded by software and may be stored in a non-transitory readable medium. Such a non-transitory readable medium may be mounted on various devices to be used.

The non-transitory readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

While the present disclosure has been shown and described with reference to certain exemplary embodiments thereof, it will be understood by those skilled in the art that various changes in form and detail may be made therein without departing from the spirit and scope of the present disclosure, as defined by the appended claims.

What is claimed is:

1. A user terminal configured to control a display device, the user terminal comprising:
   a communicator;
   a main controller configured to control the user terminal and to be in a power-off state while the user terminal is in a sleep mode; and
   a sub-controller configured to control the user terminal while the user terminal is in the sleep mode,
   wherein the sub-controller is configured to:
      control the communicator to be in a power-on state while the user terminal is in the sleep mode, and
      change a mode of the user terminal from the sleep mode to a standby mode by turning on power to the main controller in response to the communicator receiving at least one of environmental change detection information and user detection information from the display device located outside the user terminal while the user terminal is in the sleep mode, and
   wherein the environmental change detection information and the user detection information are related to the display device.

2. The user terminal as claimed in claim 1, further comprising a volatile memory,
   wherein the sleep mode is one of a second sleep mode in which power to the volatile memory is turned on and a first sleep mode in which the power to the volatile memory is turned off.

3. The user terminal as claimed in claim 2, wherein the sub-controller is configured to change the mode of the user terminal from the first sleep mode to the second sleep mode by turning on the power to the volatile memory in response to the communicator receiving environmental change detection information which indicates detection of a first event from the display device while the user terminal is in the first sleep mode.

4. The user terminal as claimed in claim 3, wherein the first event comprises at least one of a change in illumination outside illumination threshold range, a change in temperature outside a temperature threshold range, and a sound input that exceeds a threshold level.

5. The user terminal as claimed in claim 4, wherein the sub-controller is configured to change the mode of the user terminal from the second sleep mode to the standby mode by turning on power to the main controller in response to the communicator receiving user detection information which indicates detection of a second event from the display device while the user terminal is in the second sleep mode.

6. The user terminal as claimed in claim 5, wherein the second event comprises at least one of a presence of a user within a threshold distance, the display device is powered on, and a user voice input.

7. A user terminal configured to control a display device, the user terminal comprising:
   a communicator;
   a main controller configured to control the user terminal and to be in a power-on state while the user terminal is in a standby mode; and
   a sub-controller configured to:
      control the user terminal while the user terminal is in a sleep mode,
      control the communicator to be in a power-on state while the user terminal is in the sleep mode, and
   wherein the main controller is configured to:
      change a mode of the user terminal from the standby mode to the sleep mode by turning off power to the main controller in response to the communicator not receiving at least one of environmental change detection information and user detection information from the display device located outside the user terminal within a predetermined threshold time while the user terminal is in the standby mode, and
      maintain the standby mode of the user terminal in response to the communicator receiving the at least one of the environmental change detection information and the user detection information from the display device located outside the user terminal within the predetermined threshold time while the user terminal is in the standby mode, and
   wherein the environmental change detection information and the user detection information are related to the display device.

8. The user terminal as claimed in claim 7, wherein the at least one of the environmental change detection information and the user detection information relates to at least one of a presence of a user within a threshold distance, a user voice input, a change in illumination outside an illumination threshold range, a temperature change outside a temperature threshold range, and a sound input exceeding a threshold level.

9. The user terminal as claimed in claim 8, further comprising:
   a volatile memory; and
   a nonvolatile memory,
   wherein the sub-controller is configured to apply power to the main controller in response to the receiving the at least one of the environmental change detection information and the user detection information after the power to the main controller is turned off, and
   the main controller is configured to move information stored in the volatile memory to the nonvolatile memory and to turn off the power to the main controller and the volatile memory.

10. A control method of a user terminal configured to control a display device, the control method comprising:

operating the user terminal in a sleep mode and controlling a communicator of the user terminal to be in a power-on state while the user terminal is in the sleep mode; and changing a mode of the user terminal from the sleep mode to a standby mode by turning on power to a main controller of the user terminal in response to the user terminal receiving, through the communicator, at least one of environmental change detection information and user detection information from the display device located outside the user terminal while the user terminal is in the sleep mode, wherein the main controller is in a power-off state while the user terminal is in the sleep mode, and wherein the environmental change detection information and the user detection information are related to the display device.

11. The control method as claimed in claim 10, wherein the user terminal comprises a volatile memory, and the sleep mode is one of a second sleep mode in which power to the volatile memory is turned on or a first sleep mode in which the power to the volatile memory is turned off.

12. The control method as claimed in claim 11, wherein the changing further comprises changing the mode of the user terminal to the second sleep mode by turning on the power to the volatile memory in response to receiving environmental change detection information which indicates detection of a first event from the display device while the user terminal is in the first sleep mode.

13. The control method as claimed in claim 12, wherein the first event comprises at least one of a change in illumination outside illumination threshold range, a change in temperature outside a temperature threshold range, and a sound input that exceeds a threshold level.

14. The control method as claimed in claim 11, wherein the changing further comprises changing the mode of the user terminal to the standby mode by turning on power to the main controller in response to receiving the user detection information which indicates detection of a second event from the display device while the user terminal is in the second sleep mode.

15. The control method as claimed in claim 14, wherein the second event comprises at least one of a presence of a user within a predetermined distance, the display device is powered on, and a user voice input.

16. A control method of a user terminal configured to control a display device comprises:

operating the user terminal in a standby mode;

changing a mode of the user terminal from the standby mode to a sleep mode by turning off power to a main controller included in the user terminal in response to the user terminal not receiving at least one of environmental change detection information and user detection information from the display device located outside the user terminal within a predetermined threshold time while the user terminal is in the standby mode; and maintaining the standby mode of the user terminal in response to the user terminal receiving the at least one of the environmental change detection information and the user detection information from the display device located outside the user terminal within the predetermined threshold time while the user terminal is in the standby mode, wherein the main controller is in a power-on state while the user terminal is in the standby mode, and wherein the environmental change detection information and the user detection information are related to the display device.

17. The control method as claimed in claim 16, wherein the at least one of the environmental change detection information and the user detection information relates to at least one of a presence of a user within a threshold distance, a user voice input, a change in illumination outside an illumination threshold range, a change in temperature outside a temperature threshold range, and a sound input exceeding a threshold level.

18. The control method as claimed in claim 17, further comprising:

applying power to the main controller in response to the receiving the at least one of the environmental change detection information and the user detection information occurring after the power to the main controller is turned off; and moving information stored in a volatile memory included in the user terminal to a nonvolatile memory included in the user terminal, and turning off power to the main controller and the volatile memory.

* * * * *